United States Patent [19]

Mizuno et al.

[11] Patent Number: 4,781,964

[45] Date of Patent: Nov. 1, 1988

[54] MAGNETIC RECORDING MEDIUM

[75] Inventors: Chiaki Mizuno; Yasuo Tamai; Hiroshi Ogawa; Shinji Saito, all of Odawara, Japan

[73] Assignee: Fuji Photo Film Co., Ltd., Japan

[21] Appl. No.: 898,350

[22] Filed: Aug. 20, 1986

[30] Foreign Application Priority Data

Aug. 20, 1985 [JP] Japan ................................ 60-182630

[51] Int. Cl.$^4$ .............................................. G11B 5/70
[52] U.S. Cl. .................................. 428/141; 428/694;
428/900
[58] Field of Search .............. 428/212, 329, 694, 480, 428/900, 141; 427/128

[56] References Cited

U.S. PATENT DOCUMENTS

| 4,202,927 | 5/1980 | Yamaguchi et al. | 428/329 |
| 4,275,107 | 6/1981 | Bartkus et al. | 428/220 |
| 4,316,927 | 2/1982 | Kimura et al. | 428/329 |
| 4,481,231 | 11/1984 | Hashimoto et al. | 427/128 |
| 4,497,865 | 2/1985 | Minami et al. | 428/694 |
| 4,546,044 | 10/1985 | Asano et al. | 428/694 |
| 4,619,855 | 10/1986 | Okita et al. | 428/694 |
| 4,619,869 | 10/1986 | Kiriyama et al. | 428/694 |
| 4,687,710 | 8/1987 | Ogawa et al. | 428/695 |

*Primary Examiner*—Paul J. Thibodeau
*Attorney, Agent, or Firm*—Gerald J. Ferguson, Jr.

[57] ABSTRACT

A magnetic recording medium such as an audio-tape or a video-tape comprising a flexible support and a magnetic recording layer provided on a surface of said support, which is characterized in that the ratio of Young's modulus of said magnetic recording layer in the longitudinal direction (Em) to Young's modulus of said support in the longitudinal direction (Eb), namely Em/Eb, is in the range of 1.20–3.20.

6 Claims, No Drawings

MAGNETIC RECORDING MEDIUM

BACKGROUND OF THE INVENTION

1. Field of the Invention

The present invention relates to a magnetic recording medium in the form of tape. More particularly, the invention relates to a magnetic recording medium in the form of tape such as an audio cassette tape or a video cassette tape which is improved in running property, durability and electromagnetic conversion characteristics in the repeated use.

2. Description of Prior Arts

A magnetic recording medium in the form of tape (e.g., an audio-tape or a video-tape encased in a cassette) has been conventionally employed or stored in an environment having less temperature variation such as in an interior of house. However, as a radio cassette tape-recorder (i.e., a cassette tape-recorder with radio), a stereo record player for automobiles or a small-sized video tape recorder, etc. are widely employed in recent years, the magnetic recording media are now frequently employed or stored in a severe environment such as an environment of high temperature, environment of high temperature and high humidity, or environment of low temperature. For instance, it is reported that the highest temperature in an automobile interior is 104° C. during day time in the summer season according to the high-temperature or low-temperature exposure test of automobile parts (JIS D 0204).

A magnetic recording medium exposed to such a high temperature is apt to shrink to curl, or to shrink more greatly on the edge of one side than that of the other side to have a bow shape in the longitudinal direction. Otherwise, a hub of a cassette half is likely deformed or ejected out, because the magnetic recording medium shrinks to excessively tighten the hub. Further, when a magnetic recording medium such as an audio-tape recorded with music is exposed to a high temperature, not only the output level greatly varies in a reproduction process to cause abnormal reproduction, but also the magnetic recording medium shows poor running property. Especially in the case of using a magnetic recording tape having a thin support (e.g., audio compact cassette tapes such as C-80 type, C-90 type and C-120 type), the above-mentioned troubles caused by the shrinkage of tapes markedly take place, because the magnetic tape encased in a cassette half is so long that the winding times of tape around the hub increases.

The audio cassette tape is used for recording music in recent years. In this case, a magnetic recording medium is required to show satisfactory frequency characteristics and a superb reproducibility of original sounds. Therefore, the occurrence of the above troubles becomes serious problem in the practical use.

In the case of a video cassette tape, very high density-recording is now possible by shortening the recording wavelength or narrowing a track width. A magnetic recording medium is, therefore, required to show excellent electromagnetic conversion characteristics such as high video outputs, high A/N ratio and excellent reproducibility of originally recorded pictures. Further, the recent wide use of portable VTRs request a tape to have an improved running property and durability. While tapes need to be highly durable, the tape thickness tends to be thinner, for example, less than 20 μm.

Therefore, both of an audio-tape and a video-tape are strongly required to have much more improved electromagnetic conversion characteristics, running property and durability than the conventional ones.

SUMMARY OF THE INVENTION

It is the first object of the present invention to provide a magnetic recording medium in the form of tape which shows an excellent running property in the repeated use.

It is the second object of the invention to provide a magnetic recording medium in the form of tape which is hardly distorted in the repeated use and able to well reproduce the recorded signals.

It is the third object of the invention to provide a magnetic recording medium in the form of tape which is free from tape distortion caused by heat shrinkage upon exposed to a high temperature and shows stable output level.

It is the fourth object of the invention to provide a magnetic recording medium in the form of tape which has a low heat shrinkage ratio, high dimensional stability and a small frequency shift of recorded signals.

It is the fifth object of the invention to provide a magnetic recording medium in the form of tape such as a thin audio cassette tape or a thin video cassette tape which has stable output level and high dimensional stability as well as a low heat shrinkage ratio and stable running property.

There is provided by the present invention a magnetic recording medium comprising a flexible support and a magnetic recording layer provided on a surface of said support, which is characterized in that the ratio of Young's modulus of said magnetic recording layer in the longitudinal direction (Em) to Young's modulus of said support in the longitudinal direction (Eb), namely Em/Eb, is in the range of 1.20–3.20.

DETAILED DESCRIPTION OF THE INVENTION

The magnetic recording medium of the invention is a magnetic recording medium in the form of tape basically comprising a flexible support and a magnetic recording layer provided thereon, which is characterized in that the ratio of Young's modulus of said magnetic recording layer in the longitudinal direction (Em) to Young's modulus of said support in the longitudinal direction (Eb), namely Em/Eb, is in the specific range. The specific range defined in the present invention has been unknown heretofore. Accordingly, materials for the preparation of the magnetic recording medium of the present invention can be selected from those employed conventionally, as far as those materials can be combined with each other, so as to satisfy the specific definitions of the invention.

A variety of materials are known as a support material of a magnetic recording medium in the form of tape, and the flexible support of the present medium can be formed from the known materials. However, the flexible support employable for the magnetic recording medium of the invention preferably has the heat shrinkage ratio of not higher than 1.8 %, more preferably not higher than 1.5 %, in the longitudinal direction after storage at 110° C. for 4 hours. Such a flexible support having low heat shrinkage ratio can be produced, for instance, by adjusting the drawing conditions in a drawing process of a plastic film or by providing heat treatment to the plastic film.

As the support material preferably employed in the invention, there can be mentioned a polyester film in which a difference of Young's modulus in the directions is made smaller (e.g., a polyester film having Young's modulus of 450–650 kg/mm$^2$ in the longitudinal direction and Young's modulus of 450–550 kg/mm$^2$ in the width direction) or a polyester film decreased in the heat shrinkage ratio which is obtained by heat-treatment of a drawn polyester film in an atmosphere of 110° C. or higher. Also preferred are films of polycarbonate, polyamide, polysulfone, polypropylene, and polyether sulfone. Among those materials, particularly preferred is a polyester film.

On one surface of the flexible support is provided a magnetic recording layer, and another surface (back surface) of the support preferably has a center line average height (Ra), namely a center average roughness, in the range of 0.01–0.1 μm, more preferably 0.02–0.08 μm, and most preferably 0.03–0.06 μm. The center line average height (Ra) is a value defined in the Section 5 of JIS-B-0601 at a cut-off value of 0.25 mm.

The magnetic recording layer provided on a surface of the support comprises a binder and a ferromagnetic powder dispersed therein. There is no specific limitation on the ferromagnetic powder employable in the invention. Examples of the ferromagnetic powder include powders of $\gamma$-Fe$_2$O$_3$, Co-containing $\gamma$-Fe$_2$O$_3$, Fe$_3$O$_4$, Co-containing Fe$_3$O$_4$, CrO$_2$, Co-Ni-P alloy and Co-Ni-Fe alloy.

Examples of the binder employable in the invention include known thermoplastic resins, thermosetting resins, reactive resins and mixtures thereof.

The thermoplastic resin employable in the invention has a softening temperature of 150° C., average molecular weight of 10,000–200,000 and polymerization degree of approx. 200–2,000. Examples of the thermoplastic resins include vinyl chloride/vinyl acetate copolymers, vinyl chloride/vinylidene chloride copolymers, vinyl chloride/acrylonitrile copolymers, acrylic acid ester/acrylonitrile copolymers, acrylic acid ester/vinylidene chloride copolymers, acrylic acid ester/styrene copolymers, methacrylic acid ester/acrylonitrile copolymers, methacrylic acid ester/vinylidene chloride copolymers, methacrylic acid ester/styrene copolymers, urethane elastomer, polyvinyl fluoride, vinylidene chloride/acrylonitrile copolymers, butadiene/acrylonitrile copolymers, polyamide resins, polyvinyl butyral, cellulose derivatives (e.g., cellulose acetate butyrate, cellulose diacetate, cellulose triacetate, cellulose propionate and nitrocellulose), styrene/butadiene copolymers, polyester resins, chlorovinyl ether/acrylic acid ester copolymers, amino resins, various thermoplastic resins of synthetic rubber type, and mixtures thereof.

The thermosetting resin or the reactive resin generally employed in the invention has molecular weight of 200,000 in the form of a coating solution, and shows a molecular weight of infinity when hardened after coating and drying. Examples of the thermosetting resins and the reactive resins include phenol resin, epoxy resin, polyurethane hardening resin, urea resin, melamine resin, alkyd resin, silicone resin, acrylic reactive resin, a mixture of high-molecular polyester resin and isocyanate prepolymer, a mixture of methacrylate copolymer and diisocyanate prepolymer, a mixture of polyester polyol and polyisocyanate, a mixture of urea-formaldehyde resin and low-molecular glycol/high-molecular diol/triphenylmethanetriisocyanate, polyamine resin and mixtures thereof.

It is known that a variety of additives such as a dispersing agent and a lubricant can be incorporated into a magnetic recording layer in the preparation of a magnetic recording medium, and those additives can be appropriately incorporated into the magnetic recording layer of the magnetic recording medium of the present invention.

A variety of methods are also known as a method for preparing a magnetic recording medium comprising the steps of preparing a magnetic paint (coating dispersion) containing every component dispered in an organic solvent, and applying the magnetic paint onto a surface of a support to form a magnetic recording layer on the support. The magnetic recording medium of the present invention can be prepared by utilizing these known methods.

The magnetic recording medium in the form of tape according to the present invention is characterized in that the ratio of Young's modulus of the magnetic recording layer in the longitudinal direction (Em) to Young's modulus of the support in the longitudinal direction (Eb), namely Em/Eb, is larger than that of the conventional ones, and the ratio is in the specific range.

The specific range of the ratio Em/Eb can be obtained by adjusting any one or both of the Young's modulus of the flexible support and the Young's modulus of the magnetic recording layer. The Young's modulus of the flexible support can be adjusted by appropriately selecting the material of the support or by varying the conditions of various treatments such as drawing treatment or heat treatment. The Young's modulus of the magnetic recording layer can be adjusted, for example, by varying the amount ratio between the ferromagnetic powder and the binder to be contained in the layer, adjusting the Young's modulus of the binder, or by appropriately selecting the kinds and amounts of the aforementioned additives. From the viewpoint of practical procedure, a process of adjusting the binder components is preferably employed. For example, a resin of relatively high Young's modulus and a resin of relatively low Young's modulus are employed in combination to prepare a magnetic recording layer having the desired Young's module.

In the present invention, the Young's modulus of the magnetic recording layer is determined in consideration of the Young's modulus of the support, and the Young's modulus of the magnetic recording layer in the longitudinal direction (Em) is generally set to be in the range of 720–2,000 kg/mm$^2$, preferably 750–1,500 kg/mm$^2$. In more detail, the Young's modulus of the magnetic recording layer in the longitudinal direction (Em) and the Young's modulus of the support in the longitudinal direction (Eb) are appropriately adjusted in such a manner that the ratio (Em/Eb) is in the range of 1.20–3.20. Particularly preferred range of Em/Eb is 1.25–2.50.

The magnetic recording medium of the invention preferably has heat shrinkage ratio of not higher than 0.8 % (i.e., not higher than 0.008), more preferably not higher than 0.5% (i.e., not higher than 0.005) in the longitudinal direction after the medium is allowed to stand at 110° C. for 4 hours. A magnetic recording tape having such low heat shrinkage ratio can keep its excellent electromagnetic conversion characteristics even after the tape is stored or allowed to stand at a high temperature.

The magnetic recording medium of the present invention has the following advantages:

(1) Tape distortion is hardly produced and excellent running property is obtained in the repeated use of the tape in an environment having less temperature variation or less humidity variation such as in an interior of house. Especially in the case of using a thin magnetic recording tape (e.g., audio cassette tapes such as C-80 type, C-90 type and C-120 type, or video cassette tapes for long time recording), an excellent running property can be obtained.

(2) Tape distortion is hardly produced and a stable output level is kept even after the tape is stored or allowed to stand at a temperature of 100° C. or higher.

(3) Frequency shift of the recorded signals can be made smaller so as not to be perceived auditorily or visually owing to the low heat shrinkage ratio.

(4) An inner diameter of a hub is hardly varied even after the tape is stored at a temperature of 100° C. or higher in such a condition that the tape is wound around the hub. Accordingly, a cassette encasing the tape can be smoothly introduced into or taken out from a recording and regenerating device.

(5) In the case of an audio cassette tape, a hub is not excessively tightened by the tape so as not to be ejected out because of the low heat shrinkage ratio of the tape, even after the tape is stored at a temperature of 100° C. or higher in such a condition that the tape is wound around the hub. Accordingly, deterioration of running property is decreased.

(6) Tape distortion is hardly produced even after storage of the tape at a temperature of 100° C. or higher, and therefore stoppage or running of tape can be effectively prevented in the repeated use.

The examples of the comparison example of the present invention are given below. In the following examples, the expression "part(s)" means "part(s) by weight", unless otherwise specified.

EXAMPLE 1

A magnetic paint (coating dispersion for the preparation of a magnetic recording layer) was prepared by the process comprising the steps of dispersively mixing the components indicated below for 48 hours in a ball mill to yield a paste, and filtrating the resultant mixture using a filter having an average pore size of 3 μm.

| | |
|---|---|
| $\gamma\text{-Fe}_2\text{O}_3$ (Hc: 400 Oe, needle ratio: 10/1, average particle length: 0.4 μm) | 100 parts |
| Hard resin (vinyl chloride/vinyl acetate/vinyl alcohol copolymer, copolymerization ratio = 90:3:7, degree of polymerization: 360) | 20.6 parts |
| Soft resin (thermoplastic polyurethane, molecular weight: 50,000) | 4.4 parts |
| Carbon black (particle size: 10 mμ) | 2 parts |
| Oleic acid | 1 part |
| Dimethyl polysiloxane (degree of polymerization: approx. 60) | 0.1 part |
| α-Olefin oxide (carbon atoms: 18) | 1 part |
| Methyl ethyl ketone | 150 parts |
| Cyclohexanone | 50 parts |

Independently, a polyethylene terephthalate film [draw ratios (longitudinal-lateral-longitudinal):3.0-3.0-1.5, thickness: 7μm, Young's modulus (Em, longitudinal direction): 610 kg/mm², Young's modulus (width direction): 450 kg/mm², heat shrinkage ratio upon storage at 110° C. for 4 hours: 1.02 %, center line average height (Ra): 0.046 μm] was prepared.

On the polyethylene terephthalate film was coated the magnetic paint prepared as above in such a manner that the resultant layer after drying would have thickness of 5 μm. While the coated layer was wet, the layer was treated with an electromagnet of 1,000 gauss to impart a magnetic orientation. After the coated layer was dried, the layer was subjected to supercalendering at 85° C. and 250 kg/cm, to form a magnetic recording layer having a smooth surface on the film.

The film having the magnetic recording layer was slit into a tape having width of 3.8 mm, and the tape having length of 135 m was incorporated into a Phillips-type compact cassette. Thus, an audio cassette tape was obtained.

EXAMPLE 2

The procedure of Example 1 was repeated except that the hard resin and the soft resin to be contained in a magnetic paint were employed in the amount of 21.9 parts and 3.1 parts, respectively, to prepare a magnetic paint. Using the magnetic paint, an audio cassette tape was prepared in the same manner as described in Example 1.

EXAMPLE 3

The procedure of Example 1 was repeated except that the hard resin and the soft resin to be contained in a magnetic paint were employed in the amount of 23.0 parts and 2.0 parts, respectively, to prepare a magnetic paint. Using the magnetic paint, an audio cassette tape was prepared in the same manner as described in Example 1.

EXAMPLE 4

The procedure of Example 1 was repeated except for using a vinyl chloride/vinyl acetate/vinyl alcohol copolymer (copolymerization ratio=93:3:4, degree of polymerization: 420) as a hard resin in the amount of 20.6 parts and using the soft resin in the amount of 4.4 parts, to prepare a magnetic paint. Using the magnetic paint, an audio cassette tape was prepared in the same manner as described in Example 1.

EXAMPLE 5

The procedure of Example 1 was repeated except that the hard resin and the soft resin to be contained in a magnetic paint were employed in the amount of 20.0 parts and 5.0 parts, respectively, and that the carbon black, oleic acid, and α-olefin oxide were employed in the amount of 1 part, 0.5 part and 0.5 part, respectively, to prepare a magnetic paint. Using the magnetic paint, an audio cassette tape was prepared in the same manner as described in Example 1.

COMPARISON EXAMPLE 1

The procedure of Example 1 was repeated except that the hard resin and the soft resin to be contained in a magnetic paint were employed in the amount of 20.0 parts and 5.0 parts, respectively, to prepare a magnetic paint. Using the magnetic paint, an audio cassette tape was prepared in the same manner as described in Example 1.

Evaluation of Audio Cassette Tape

In the audio cassette tapes obtained in the above examples, Young's modulus of the magnetic recording layer in the longitudinal direction (Em) was determined in the following manner.

The audio cassette tape of 50 cm was drawn under tension with a weight of 100 g. to measure the length of drawn tape. A value of the measured length was introduced into the following formula to determine Young's modulus of the sample tape (Et) (Kg/mm²):

$$Et = (\Delta F/A)/(\Delta L/Lo)$$

[ΔF=weight (kg.), A=sectional area (mm²), ΔL=drawn length, Lo=length of sample tape (mm)]

Then, Young's modulus of the magnetic recording layer was determined in accordance with the following formula:

$$Em = [Et \times dt - Eb \times db]/dm$$

[Et=Young's modulus of sample tape, Eb=Young's modulus of support, dt=thickness of tape, db=thickness of support, dm=thickness of magnetic recording layer]

Subsequently, each tape was evaluated on the following properties.

(1) Electromagnetic conversion characteristics
  (a) Frequency property: difference between output level at 10 KHz and output level at 315 Hz;
  (b) MOL325: maximum output level at 315 Hz based on the output level of a reference tape (ERC-90 type, bias: NORMAL/EQ: 120 μs, available from Fuji Photo Film Co., Ltd.) being 0 dB, distortion ratio of 3% (measuring device: 582 type produced by Nakamichi Co., Ltd); and
  (c) SOL10K: saturated output level of 10 KHz based on the output level of the above-mentioned reference tape being 0 dB. (2) Repeated running property The running tests of 20 times pass, 40 times pass and 60 times pass were carried out using 40 commercial audio cassette decks to observe the winding condition of each tape and stoppage of tape running. The results of the evaluation are classified into the following.

A: no stoppage of running is observed, and no disorder in winding is found;
  B: no stoppage of running is observed, and disorder in winding is found in 1 to 3 decks; and
  C: disorder in winding is found in 4 to 6 decks, among which stoppage of running is observed in 1 to 2 decks. (3) Tape distortion after repeated running of 100 times The repeated running of 100 times carried out in the same manner as described in the above test (2), to observe tape distortion. The results of the evaluation are classified into the following:

A: tape distortion is hardly found;
  B: some tape distortion is found but causes no practical problem on the sound quality;
  C: tape edge is stretched to give a frilled tape, but no adverse effect is given to the sound quality; and
  D: tape edge is stretched to give a frilled tape, and adverse effect is given to the sound quality.

(4) Heat shrinkage ratio after storage at 110° C. for 4 hours

The sample tape was beforehand marked at intervals of approx. 10 cm in an atmosphere of 23° C. and 60% RH, and each interval (A) between the marks was measured using a micrometer. Then, the tape was allowed to stand at 100° C. for 4 hours with a pending weight of 0.4 g. per 10 mm width, and the tape was further allowed to stand in the same atmosphere (23° C., 60 % RH) for 1 hour without weight, to measure the interval (A') between the marks. The measured values are introduced into the following formula to obtain the heat shrinkage ratio.

$$\text{Heat shrinkage ratio } \% = [(A-A')/A] \times 100$$

(5) Variation of output level at 10 KHz after storage at 110° C. for 4 hours

The sample tape was beforehand recorded with a signal of 10 KHz and −10 dB, and the tape was allowed to stand at 110° C. for 4 hours in such a condition that the tape was wound around a hub. The tape was then placed in an atmosphere of room temperature for 1 hour, and the signal was regenerated to read the variation of the output level.

In this test, 20 cassette tapes were examined on the variation of output level for each sample tape, to measure the occurrence of variation value of not less than 6 dB in the output level.

(6) Frequency shift after storage at 110° C. for 4 hours

The sample tape was beforehand recorded with a signal of 3 KHz and −10 dB, and the tape was allowed to stand at 110° C. for 4 hours in such a condition that the tape was wound around a hub. The tape was then placed in an atmosphere of room temperature for 1 hour, and the signal was reproduced. The reproduced signal was measured on its frequency to determine the shift ratio against the frequency of a signal of 3 KHz.

(7) Repeated running property after storage at 110° C. for 4 hours

Each sample tape was subjected to the repeated running test of 20 times pass described in the aforementioned test (2) after storing at 110° C. for 4 hours. The results were evaluated in the same manner as described in the test (2).

(8) Shrinkage ratio of inner diameter of hub upon storage at 110° C. for 4 hours An inner diameter of a hub was measured in such a condition that the sample tape was wound around the hub. The tape was then allowed to stand at 110° C. for 4 hours and placed in an atmosphere of room temperature for 1 hour. The inner diameter of the hub was again measured to determine the shrinkage ratio (%) of the hub.

The results of the evaluations obtained in the above-described tests are set forth in Tables 1 and 2. Set forth in Table 2 are the evaluations of the tapes after storage at 110° C. for 4 hours.

TABLE 1

|  | Example | | | | | Com. Example |
|---|---|---|---|---|---|---|
|  | 1 | 2 | 3 | 4 | 5 | 1 |
| Em | 780 | 1170 | 1900 | 840 | 770 | 690 |
| Em/Eb | 1.28 | 1.92 | 3.11 | 1.38 | 1.26 | 1.13 |
| Electromagnetic conversion characteristics | | | | | | |
| (a) | +1.0 | +0.7 | +0.1 | +1.0 | +0.8 | +1.0 |
| (b) | +0.2 | 0.0 | −0.4 | +0.3 | +0.1 | +0.2 |
| (c) | +1.2 | +0.9 | +0.3 | +1.1 | +0.9 | +1.3 |
| Repeated running property | | | | | | |
| 20 times | A | A | A | A | A | A |
| 40 times | A | A | A | A | A | B |
| 60 times | A | A | A | A | A | C |
| Tape distortion after running of 100 times | B | A | A | A | B | D |

TABLE 2

|  | Example 1 | Example 2 | Example 3 | Example 4 | Example 5 | Com. Example 1 |
| --- | --- | --- | --- | --- | --- | --- |
| Heat shrinkage ratio (%) | 0.45 | 0.36 | 0.28 | 0.39 | 0.45 | 0.48 |
| Variation of output level (%) (10 KHz) | 5 | 0 | 0 | 0 | 0 | 0 |
| Frequency shift (%) | 0.08 | 0.06 | 0.03 | 0.06 | 0.08 | 0.08 |
| Repeated running property 20 times | A | A | A | A | B | C |
| Shrinkage ratio of inner diameter of hub (%) | 1.6 | 1.3 | 2.5 | 1.5 | 1.7 | 1.8 |

We claim:

1. A magnetic recording medium comprising a flexible support and a magnetic recording layer provided on a surface of said support, wherein Young's modulus of said magnetic recording layer in its longitudinal direction is in the range of 720–2,000 kg/mm$^2$, a Young's modulus of said support in its longitudinal direction is in the range of 450–650 kg/mm$^2$, a ratio of Young's modulus of said magnetic recording layer in the longitudinal direction to Young's modulus of said support in the longitudinal direction is in the range of 1.20–3.20, a heat shrinkage ratio of said magnetic recording medium in its longitudinal direction after being allowed to stand at 110° C. for four hours is not higher than 0.008, and said support has a center line average height in the range of 0.02–0.1 μm on its back surface.

2. The magnetic recording medium as claimed in claim 1, wherein the ratio of Young's modulus of said magnetic recording layer in the longitudinal direction to Young's modulus of said support in the longitudinal direction is in the range of 1.25–2.50.

3. The magnetic recording medium as claimed in claim 1, wherein the Young's modulus of said magnetic recording layer in the longitudinal direction is in the range of 750–1,500 kg/mm$^2$.

4. The magnetic recording medium as claimed in claim 1, wherein the heat shrinkage ratio of said magnetic recording medium in the longitudinal direction is not higher than 0.5% after said medium is allowed to stand at 110° C. for 4 hours.

5. The magnetic recording medium as claimed in claim 1, wherein said support has a center line average height in the range of 0.02–0.08 μm on the back surface.

6. The magnetic recording medium as claim in claim 1, wherein said support has a center line average height in the range of 0.03–0.06 μm on the back surface.

* * * * *